(12) United States Patent
Yan

(10) Patent No.: US 7,693,219 B2
(45) Date of Patent: Apr. 6, 2010

(54) SYSTEM AND METHOD FOR FAST MOTION ESTIMATION

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1022 days.

(21) Appl. No.: 11/325,066

(22) Filed: Jan. 4, 2006

(65) Prior Publication Data

US 2007/0153897 A1 Jul. 5, 2007

(51) Int. Cl.
*H04N 7/12* (2006.01)
*H04N 11/02* (2006.01)

(52) U.S. Cl. .............................. 375/240.16; 348/420.1

(58) Field of Classification Search ............ 375/240.16, 375/240.24, 240.12, 240.26, 240.29, 240.03, 375/240.02, 240.2; 382/236, 238, 239, 248, 382/250; 348/407.1, 413.1, 416.1, 425.2, 348/402.1
See application file for complete search history.

(56) References Cited

U.S. PATENT DOCUMENTS

| 6,865,227 | B2 | 3/2005 | Chan | |
|---|---|---|---|---|
| 2004/0126034 | A1* | 7/2004 | Yu et al. ..................... | 382/260 |
| 2004/0139462 | A1 | 7/2004 | Hannuksela et al. | |
| 2004/0146113 | A1 | 7/2004 | Valente | |
| 2005/0013369 | A1* | 1/2005 | Lee ........................ | 375/240.16 |
| 2005/0025249 | A1 | 2/2005 | Zhao et al. | |
| 2005/0207494 | A1* | 9/2005 | Ahn et al. .............. | 375/240.16 |
| 2006/0285594 | A1* | 12/2006 | Kim et al. .............. | 375/240.16 |
| 2007/0081586 | A1* | 4/2007 | Raveendran et al. ..... | 375/240.1 |
| 2007/0098077 | A1* | 5/2007 | Sun et al. ............... | 375/240.18 |
| 2007/0104274 | A1* | 5/2007 | Kim et al. .............. | 375/240.13 |

FOREIGN PATENT DOCUMENTS

WO WO 2005/004491 A1 1/2005

OTHER PUBLICATIONS

Thomas Wiegand, Gary J. Sullivan, Gisle Bjontegaard and Ajay Luthra, *Overview of the H.264/AVC Video Coding Standard* IEEE Transactions on Circuits and Systems for Video Technology, vol. 13, No. 7 Jul. 2003.
Iain E G Richardson, *H.264/MPEG-4 Part 10:Overview*, www.vcodex.com dated Oct. 7, 2002; pp. 1-3.

(Continued)

*Primary Examiner*—Behrooz Senfi
(74) *Attorney, Agent, or Firm*—Gary R. Stanford

(57) ABSTRACT

A fast motion estimation system that determines a reference macroblock or sub-block combination within a reference frame for a current macroblock in a current frame includes a memory, a reference macroblock search circuit, a sub-block combination search circuit, and a comparator circuit. The reference macroblock search circuit determines a motion vector, multiple difference values, and a cost value for each macroblock within the reference frame according to a fast motion estimation search pattern, and stores the motion vector and the difference values in the memory. The sub-block combination search circuit searches the motion vector and the difference values in the memory for determining a corresponding one of multiple lowest cost sub-block combinations for each of multiple sub-block motion modes. The comparator circuit determines a lowest cost macroblock and selects from among the lowest cost macroblock and the lowest cost sub-block combinations to determine the reference macroblock.

20 Claims, 4 Drawing Sheets

OTHER PUBLICATIONS

Iain E G Richardson, *H.264/MPEG-4 Part 10:Introduction to CABAC*, www.vcodex.com dated Oct. 17, 2002; pp. 1-3.

Iain E G Richardson, *H.264/MPEG-4 Part 10:Variable Length Coding*, www.vcodex.com dated Oct. 17, 2002; pp. 1-7.

Iain E G Richardson, *H.264/MPEG-4 Part 10:Transform & Quantization*, www.vcodex.com dated Mar. 19, 2003; pp. 1-9.

Iain E G Richardson, *H.264/MPEG-4 Part 10:Interprediction*, www.vcodex.com dated Mar. 30, 2003; pp. 1-3.

Iain E G Richardson, *H.264/MPEG-4 Part 10:Intra Prediction*, www.vcodex.com dated Mar. 30, 2003; pp. 1-5.

Iain E G Richardson, *H.264/AVC Frame and Picture Management*, www.vcodex.com dated Jan. 29, 2004; pp. 1-7.

Wayne E. Bretl and Mark Fimoff, *MPEG2 TUTORIAL (Introduction to MPEG 2 Video Compression)*, www.bretl.com Jan. 15, 2000. http://www.bretl.conn/mpeghtml/mpeg2vc1.HTM.

Yu Chen, Keman Yu, Jiang Li and Shipeng Li, *An Error Concealment Algorithm for Entire Frame Loss in Video Transmission*, Picture Coding Symposium 2004, Dec. 15-17, 2004, San Francisco, USA.

J.Park, D-C Park, R.J. Marks, M.A. El-Sharkawi, *Content-Based Adaptive Spatio-Temporal Methods for MPEG Repair*, IEEE TRANS, ON Image Processing, vol. 13, No. 8, Aug. 2004.

International Search Report and Written Opinion for correlating PCT Patent Application No. PCT/US06/61176 dated Aug. 25, 2008.

* cited by examiner

| POSITION | 16X16 MV | 8X8 UL SAD | 8X8 UR SAD | 8X8 LL SAD | 8X8 LR SAD |
|---|---|---|---|---|---|
| 1 | MV1 | $SAD_1$ | $SAD_2$ | $SAD_3$ | $SAD_4$ |
| 2 | MV2 | $SAD_5$ | $SAD_6$ | $SAD_7$ | $SAD_8$ |
| 3 | MV3 | $SAD_9$ | $SAD_{10}$ | $SAD_{11}$ | $SAD_{12}$ |
| ⋮ | ⋮ | ⋮ | ⋮ | ⋮ | ⋮ |
| P | MVP | $SAD_{4P-3}$ | $SAD_{4P-2}$ | $SAD_{4P-1}$ | $SAD_{4P}$ |

SYSTEM AND METHOD FOR FAST MOTION ESTIMATION

BACKGROUND OF THE INVENTION

1. Field of the Invention

The present invention relates in general to video encoding, and more specifically to a system and method of performing fast motion search for motion estimation in a video encoder which is particularly useful for low power consumption handheld multimedia devices and/or low bitrate video communications.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bitrate or improved video quality at a given transmission rate. The newer standard outperforms video compression techniques of prior standards in order to support higher quality streaming video at lower bitrates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock (MB) level, where each MB is a 16×16 block of pixels. An MB can also refer to sub-blocks of data of different sizes, such as 16×8, 8×16, 8×8, 8×4, 4×8, 4×4, etc., without loss of generality. As used herein, the term "sub-block" is used to refer to an MB smaller than 16×16. Each MB is encoded in 'intraframe' mode in which a prediction MB is formed based on reconstructed MBs in the current frame, or 'interframe' mode in which a prediction MB is formed based on the MBs of the reference frames. The intraframe encoding mode applies spatial information within the current frame in which the prediction MB is formed from samples in the current frame. The interframe encoding mode utilizes temporal information from previous and/or future reference frames to estimate motion to form the prediction MB. In either case, a reference frame is used which has previously been encoded, decoded and reconstructed.

Motion estimation (ME) is critical for achieving good video compression in terms of rate-distortion (R-D) theory. The purpose of ME is to reduce temporal redundancy between frames of a video sequence. An ME algorithm predicts image data for an image frame using at least one reference frame in order to encode the image frame. A difference image is determined by taking the arithmetic difference between the original pixel data and the corresponding predicted pixel data. A full search motion estimation (FSME) is to perform motion search at each pixel location in a predefined search range within the reference frame/frames. Normally, a SAD (sum of absolute difference) value is used to evaluate the best match between the MB or sub-blocks to be encoded and the corresponding MB or sub-blocks in the reference frames. For a MB, the SAD calculation takes at least 16×16 absolute differences and an addition. If N pixels, e.g. 48×48, exist in the predefined search range, there will be N times of SAD calculations. In addition, for sub-block motion modes like 16×8, 8×16, 8×8, etc. the ME process is repeated. Thus, ME is a very CPU- and memory-bounded computationally intensive operation, however, and it has been difficult to find a simple and effective way to perform ME while maintaining acceptable rate-distortion. Furthermore, the value-adding multimedia applications (e.g., video communications) in wireless and mobile devices are limited due to power consumption and channel bandwidth constraints. The FSME method is implemented in the Reference CODEC (e.g. JVM10.0), where the SAD is calculated on a 4×4 block level and summed up for all seven motion modes (16×16, 16×8, 8×16, 8×8, 8×4, 4×8, 4×4). In order for the FSME to find the best motion vector among all motion modes, 16 SAD values are computed for each pixel or sub-pixel position in the search range within the reference frame, which is impractical in wireless or mobile applications because of the amount of computations. Second, for low-bitrate communication channels, the sub-block modes such as 8×8, 8×4, 4×8 and 4×4, are seldom used resulting in a waste of resources.

The complexity of the encoder is a bottleneck for multimedia applications using video, especially in wireless and mobile devices in which the computing and power resources and the transmission rate are limited. It is desired to streamline the interframe encoding process by increasing speed and reducing computations to conserve resources while providing acceptable encoding efficiency and visual quality.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
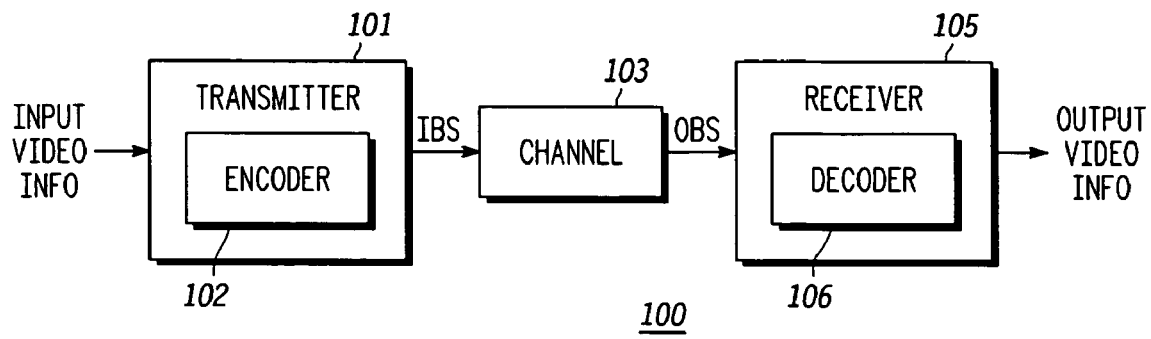
FIG. 1 is a simplified block diagram of a video system including an encoder implemented according to an embodiment of the present invention.

FIG. 1 is a simplified block diagram of a video system 100 including an encoder 102 implemented according to an embodiment of the present invention. Video information is provided to an input of a transmitter 101, which includes the encoder 102. The encoder 102 encodes the video information according to the appropriate video standard (e.g., MPEG-4, H.264, etc.) and the transmitter 101 further processes the information according to the targeted media or medium for which it is designed. The video information is transmitted as in input bitstream IBS via a channel 103 and provided as an output bitstream OBS to a receiver 105, which includes a decoder 106. In an exemplary configuration, the channel 103 is a medium with constrained bandwidth such as a wireless medium or the like. The transmitter 101 encapsulates the video information into a bitstream or RTP packets or the like in which each packet includes one or more macroblocks of a video frame. The encoder 102 is configured to perform fast motion estimation according to an embodiment of the present invention as further described below. Further details of the channel 103 and receiver 105 are not provided as not necessary for a full and complete understanding of the present invention.

Figure 2:
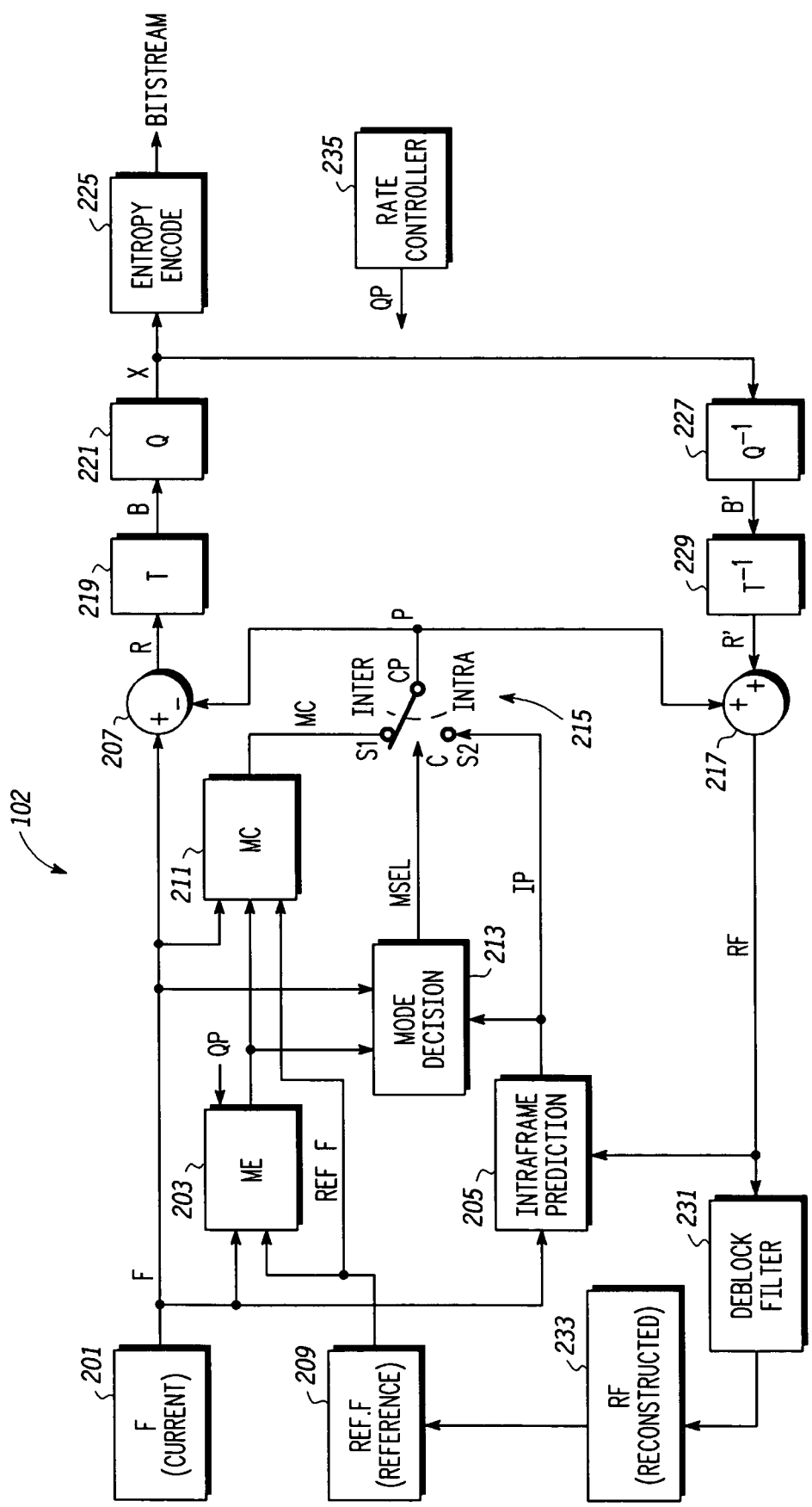
FIG. 2 is a simplified block diagram of the encoder of FIG. 1 implemented according to an exemplary embodiment of the present invention.

FIG. 2 is a simplified block diagram of the encoder 102 implemented according to an exemplary embodiment of the present invention. A frame storage 201 provides the current frame F for encoding to one input of a motion estimation (ME) circuit 203, to one input of an intraframe prediction circuit 205, to a positive input of a combiner 207 (e.g., adder or subtractor or the like), to one input of a motion compensation (MC) circuit 211, and to an input of a mode decision circuit 213. Another frame storage 209 provides a reference frame (REF F) to another input of the ME circuit 203 and to another input of the MC circuit 211. The frame storage 209 includes one or more previously encoded, decoded and reconstructed frames including the reference frame REF F used for encoding. The ME circuit 203 provides motion estimation information at its output, which is coupled to another input of the MC circuit 211 and to another input of the mode decision circuit 213. The MC circuit 211 provides motion compensated prediction information (e.g., interframe prediction MB) MC to a first input terminal S1 of a selector switch 215, illustrated as a single-pole, double-throw (SPDT) having input terminals S1 and S2, control input terminal C and a common terminal CP providing a selected input as its output. The intraframe prediction circuit 205 provides intraframe prediction information (e.g., intraframe prediction MB) IP to an input of the mode decision circuit 213 and to the input terminal S2 of the switch 215. The mode decision circuit 213 has an output providing a mode decision select signal MSEL to the control terminal C of the switch 215 for selecting between MC (motion compensated interframe MB) or IP (intraframe prediction MB).

The CP terminal of the switch 215 provides a selected prediction MB, illustrated as symbol P, to a negative input of the combiner 207 and to a positive input of another combiner 217, which is an adder in the illustrated embodiment. The combiner 207 subtracts the selected prediction MB P from the current MB of current frame F to provide a residual MB, illustrated as symbol R, to the input of a transform circuit 219. The transform circuit 219 performs a block transform, such as the discrete cosine transform (DCT), and outputs the transform result, illustrated as symbol B. The transform result B is provided to a quantization circuit 221, which outputs quantized transform coefficients, illustrated as symbol X. The X coefficients are provided to the input of an entropy encode circuit 225, which provides a compressed bitstream for transmission via the channel 103, or otherwise for storage.

The X coefficients are provided to the input of an inverse quantization circuit 227, which outputs estimated transformed information, illustrated as symbol B' which represents an estimated or reconstructed version of the transform result B. The estimated transformed information B' is provided to the input of an inverse transform circuit 229, which outputs estimated residual information, illustrated as symbol R', which represents a reconstructed version of the residual MB R. The reconstructed residual MB R' is provided to another positive input of the combiner 217. In the embodiment shown, the combiner 217 adds P to R' to generate an unfiltered reconstructed MB, which becomes part of reconstructed frame information RF. The reconstructed frame information RF is provided to another input of the intraframe prediction circuit 205 and to a deblocking filter circuit 231. The deblocking filter 231 (e.g., per H.264 specification) filters the reconstructed frame RF information and provides filtered reconstructed frames to an RF storage 233. One or two previously encoded and decoded frames from the RF storage 233 are provided to the frame storage 209 to serve as reference frames for purposes of encoding as known to those skilled in the art.

The encoder 102 is also shown including a rate controller 235 providing a quantization parameter (QP). The QP is provided to and used by various circuits of the encoder, including the ME circuit 203, the mode decision circuit 213, the quantization circuit 221, the inverse quantization circuit 227, and the deblocking filter circuit 231. The QP is shown provided to the ME circuit 203 for purposes of adjusting motion mode bias as further described below.

The present invention is directed towards motion estimation performed by the ME circuit 203 used for interframe encoding. Motion estimation involves searching for a reference MB within the reference frame that most closely matches the current MB being encoded in the current frame. The reference MB is in the form of a single reference MB (with a single motion vector) or multiple sub-blocks combined together (with multiple motion vectors) that collectively form a reference MB. The sub-block combinations include, for example, two 16×8 sub-blocks for the 16×8 motion mode, two 8×16 sub-blocks for the 8×16 motion mode, or four 8×8 sub-blocks for the 8×8 motion mode. The sub-blocks forming any sub-block combination used as the reference MB may be selected from any combination of MBs in the search pattern and are not necessarily contiguous. In one embodiment, an integer search is first performed to find an integer reference MB and then the reference MB is further interpolated within the ME circuit 203 down to the ½ or ¼ pel (picture element or pixel) to achieve more accurate reference information. Alternatively, an integer search can be combined with a sub-pixel search or the search itself may be performed at the sub-pixel level during motion estimation. The ME circuit 203 provides one or more motion vectors to the MC circuit 211, which forms the interframe prediction block from the reference frame using the computed motion vector(s).

Figure 3:
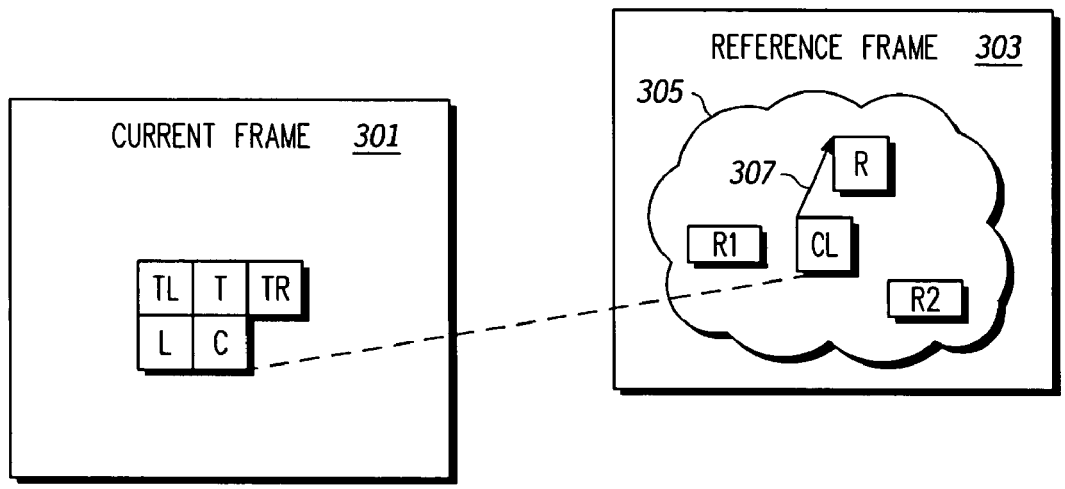
FIG. 3 is a figurative block diagram illustrating a current MB of a current frame to be encoded using interframe encoding using information from a reference frame.

FIG. 3 is a figurative block diagram illustrating a current MB of a current frame 301 to be encoded using interframe encoding using information from a reference frame 303. The current MB in the current frame 301 is labeled "C" and is the next MB within the current frame 301 to be encoded. The reference frame 303 includes a collocated MB labeled CL, which is positioned at the same relative position within the reference frame 303 as the location of the current MB within the current frame 301. In order to encode the current MB, the ME circuit 203 performs a search within a predetermined search area 305 of the reference frame 303 in order to find a suitable reference MB used to reconstruct the current MB. In a FSME method, a large search area 305 up to including the entire reference frame 303 is searched for a reference MB having the smallest SAD value. A first exemplary reference MB labeled R is shown in the search area 305. Another exemplary reference MB is shown as a sub-block combination including two 16×8 sub-blocks labeled R1 and R2. The SAD value is a typical distortion measure between the current MB from the current frame 301 and is used to select the reference MB within the search area 305. The absolute values of the differences between each pel of the current MB and the corresponding pel of the selected reference MB are summed together to calculate the SAD associated with the selected reference MB. The SAD value is then biased by the coding cost of the motion mode and motion vectors. A small biased SAD value means a good block match (lesser distortion) whereas a large biased SAD value corresponds to a poor block match (higher distortion). For example, in a generally rectangular-shaped search area, the upper-left most MB within the search area 305 of the reference frame 303 is the start MB for a first SAD value, then a next MB is selected by advancing one pel horizontally to the right and so on until the entire top row of the search area is completed. Then the search commences back to the left-most side of the search area 305 except advanced vertically down one pel, and then the search continues by advancing one pel at a time horizontally to the right for the next row, and so on.

FSME (such as described for the Reference CODEC) is an exhaustive search that is computationally intensive and time consuming and not suitable for many applications, including multimedia hand-held devices and/or low-bandwidth applications. For such limited computing power and bandwidth applications, it is desired to reduce the search and to consider the relative cost of encoding the current MB. The cost of encoding considers the SAD combined with cost of encoding each motion vector (MV) associated with the selected reference MB. Each MV is an ordered pair of X, Y components or coordinates defining the position of a selected reference MB (or sub-block of a sub-block combination) within the reference frame 303 relative to the collocated MB. The X coordinate increases from left to right and the Y coordinate increases from top to bottom as understood by those of ordinary skill in the art. The reference block labeled R is shown within the search area 305 at a position relative to the collocated block defined by a motion vector 307. The motion vector 307 is defined between the upper left pel of the collocated MB and the upper left pel of the reference MB. The X, Y coordinates are relative to the upper left pel of the collocated MB, which is defined as X=0 and Y=0. Thus, the X value defines the horizontal displacement and the Y value defines the vertical displacement of the R reference MB relative to the collocated MB. As understood by those of ordinary skill in the art, the cost of encoding the motion vector of the reference MB is determined relative to the median MV for the current MB. The closer the motion vector of the reference MB to the median MV, the lower the cost of encoding for that motion vector. The cost of encoding is determined as the SAD value combined with the cost of encoding the motion vector(s) of the selected reference MB, which is based on the differential between each median MV and the corresponding motion vector(s) of the reference MB. Thus, a reference MB having a relatively small SAD might be rejected if there is a relatively high cost of encoding its motion vector if it is relatively far from the collocated MB. A reference MB having a slightly larger SAD but significantly closer to the collocated MB has less cost for encoding its MV, and thus may have a smaller overall cost.

In a fast ME search method according to an embodiment of the present invention, multiple potential start MBs are examined and the one having the smallest cost value in terms of encoding is selected. And then a fast search is conducted beginning at the selected start MB according to a selected search pattern. In one embodiment, the potential start MBs include the collocated MB, the start MB associated with the median MV (since having the least cost for encoding its MV and potentially having a relatively low SAD), and each of the start MBs associated with the motion vector of each of the neighboring or adjacent macroblocks. The current frame 301 includes several MBs adjacent to or neighboring the current MB as understood by those of ordinary skill in the art, including a top MB immediately above the current MB and labeled "T", a top right MB immediately to the right of the top MB and labeled "TR", a left MB immediately to the left of the current MB and labeled "L", and a top left MB located immediately to the left of the top MB and labeled "TL". The motion vectors of the T, L and TR neighboring MBs are usually considered except that if the TR macroblock is not available, the TL MB is used instead of the TR block.

Once a start MB is selected, the search commences by examining 16×16 MBs according to a predetermined search pattern. The present invention is not limited to any particular search method or pattern since several are known and contemplated. In one embodiment of the present invention, for example, a spiral search pattern is selected according to that shown and described in U.S. Pat. No. 6,925,123 entitled "Method And Apparatus For Performing High Quality Fast Predictive Motion Search" issued Aug. 2, 2005 to Subramaniyan et al., which is incorporated herein by reference for all intents and purposes. Alternative search patterns are contemplated, such as zig-zag patterns, diamond patterns, etc.

Figure 4:
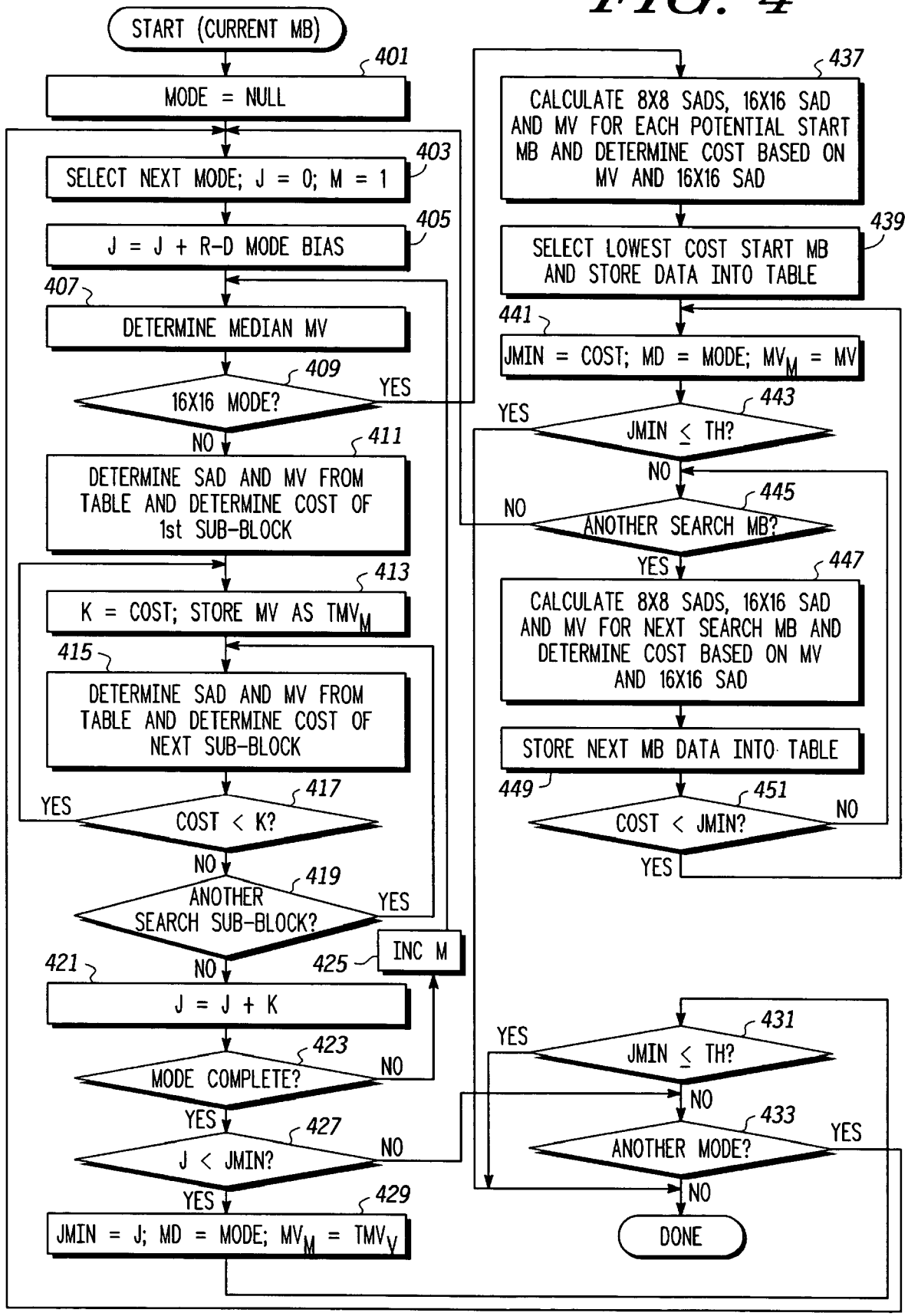
FIG. 4 is a flowchart diagram illustrating operation of the ME circuit of FIG. 2 for executing a fast motion search according to an exemplary embodiment of the present invention.

FIG. 4 is a flowchart diagram illustrating operation of the ME circuit 203 for executing a fast motion search according to an exemplary embodiment of the present invention. The flowchart is performed to determine interframe encoding of each MB using reference information from the reconstructed reference frame 303. At first block 401, a motion mode value MODE is initialized to "NULL" (or otherwise to zero or any other initial value). At next block 403, the MODE value is incremented or updated to select the next motion mode for performing the motion search. The motion modes are performed in the following order: 16×16, 16×8, 8×16 and 8×8. In one embodiment, the present invention contemplates the additional motion modes 8×4, 4×8 and 4×4 according to the standard. As previously described, however, these additional motion modes add a significant amount of computation, complexity and bandwidth and thus are typically ignored. In one embodiment, the MODE value is an integer flag value initialized to zero (0) and incremented by one to step through the motion modes, in which a MODE value of 1 is for 16×16, 2 is for 16×8, 3 is for 8×16, and 4 is for 8×8. Also at block 403, a cost value J for the current MB is initialized to zero (0) and a motion vector index value M is set equal to one (1).

At next block 405, the cost value J is increased by the rate-distortion (R-D) mode bias for the current motion mode. In one embodiment, for the first iteration for the 16×16 motion mode, the mode bias is set to be the lowest one due to the cost effectiveness, i.e. one motion vector only. The 16×8 and 8×16 motion modes each require two sub-blocks (for each MB) and thus have a positive bias value as understood by those skilled in the art. The 8×8 motion mode has 4 sub-blocks per MB and thus has the largest mode bias. In one embodiment, the bias values for 16×16, 16×8, 8×16 and 8×8 are determined according to the total number of bits needed to encode the mode information, e.g. 1, 3, 3, and 5, respectively, which is further weighted by a quantization parameter (QP) from a rate controller (not shown). At next block 407, the median MV is determined for the current mode and sub-block orientation as determined according to the standard. The median MV is based on the motion vectors of the neighboring MBs as understood by those skilled in the art and is used for purpose of comparison for determining the cost of encoding each motion vector that deviates from the median MV. The sub-block orientation refers to the relative location of the sub-block within an MB. As described further below, a separate median MV is determined for the 16×16 motion mode, for each of the pair of upper/lower or left-hand/right-hand sub-blocks of the 16×8 and 8×16 motion modes, respectively, and for each of the four sub-blocks of the 8×8 motion mode.

At next block 409, it is queried whether the motion mode is 16×16. In the first iteration of the flowchart, the first motion mode is 16×16 so that operation proceeds to block 437 from block 409. At block 437, the SAD value and corresponding motion vector is determined for each start MB from among multiple potential start MBs within the reference frame 303. As previously described, the potential start MBs in one embodiment according to the present invention include the collocated MB, the start MB associated with the median MV, and each of the start MBs associated with the motion vector of each of the neighboring MBs (T, TR and L or TL, T and L). Also, a cost value COST is determined for each potential start MB, where the COST value is determined by combining the SAD value with the cost of encoding the corresponding motion vector for each potential start MB.

Figure 5:
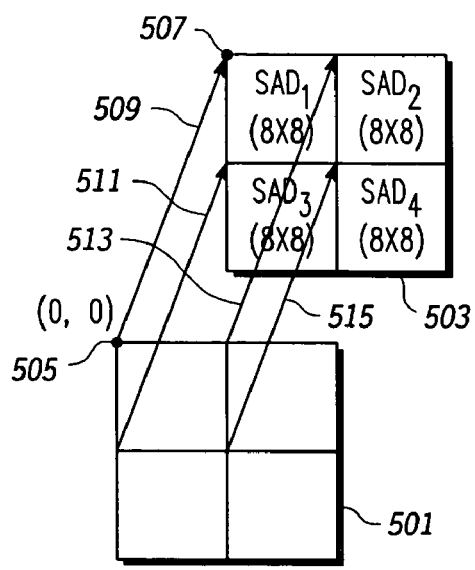
FIG. 5 is a block diagram illustrating an exemplary collocated MB and an exemplary reference MB showing exemplary motion vectors and 8×8 SAD values.

The 16×16 SAD value for each start MB (and for each reference MB thereafter) may be determined directly by summing the absolute values of all 256 pel difference values. In another embodiment, each 16×16 MB is divided into four 8×8 sub-blocks and a SAD value is determined for each 8×8 sub-block. FIG. 5 is a block diagram illustrating an exemplary collocated MB 501 and an exemplary reference MB 503 showing exemplary motion vectors and 8×8 SAD values. As shown, the reference MB 503 is divided into four equal-sized 8×8 sub-blocks. A SAD value is calculated for each, including a value $SAD_1$ for the upper-left sub-block, a value $SAD_2$ for the upper-right sub-block, a value $SAD_3$ for the lower-left sub-block, and a value $SAD_4$ for the lower-right sub-block. An advantage of calculating the four 8×8 SAD values is that the SAD values for the other motion modes 16×16, 16×8, and 8×16 may be derived from the 8×8 SAD values. The single 16×16 SAD value is calculated as the sum of all four 8×8 SAD values, or $SAD_{16\times16}=SAD_1+SAD_2+SAD_3+SAD_4$. The two 16×8 SAD values are calculated as $SAD1_{16\times8}=SAD_1+SAD_2$ and $SAD2_{16\times8}=SAD_3+SAD_4$. The two 8×16 SAD values are calculated as $SAD1_{8\times16}=SAD_1+SAD_3$ and $SAD2_{8\times16}=SAD_2+SAD_4$. And of course the 8×8 SAD values have already been determined.

In an alternative embodiment, the 256 difference values of the MB are stored instead of the four 8×8 SAD values since all SAD values can still be derived from the pel difference values. A potential benefit of storing the pel difference values is the ability to calculate 8×4, 4×8 and 4×4 SAD values if deemed desirable. It has been determined, however, that maximal efficiency is achieved by stopping at the 8×8 motion mode. And storing four 8×8 SAD values consumes significantly less memory than 256 pel difference values. In another embodiment, it is contemplated to determine and store 16 4×4 SAD values since all of the motion modes according to the standard may be determined.

Since the motion vector is the amount of translation that the reference MB has relative to the current MB, each sub-block has the same motion vector as the 16×16 reference MB except that some motion vectors have a different reference point. As shown, the upper-left pel of the collocated MB 501 is a reference point 505 associated with X,Y coordinates 0, 0. The motion vector of the selected reference MB 503 is the position of that reference MB relative to the position of the collocated MB. As illustrated, the reference MB 503 has its upper-left pel at a point 507. A motion vector 509 is drawn between points 505 and 507 to locate the reference MB 503 relative to the collocated MB 501 at the (0, 0) position. The motion vector 509 is the same for the 16×16 MB, the upper 16×8 sub-block, the left-side 8×16 sub-block, and the upper-left 8×8 sub-block. A second motion vector 511 points to the upper left pel of the lower-left 8×8 sub-block, which is the motion vector for the lower-left 8×8 and for the lower 16×8 sub-block relative to the (0, 8) position of the collocated MB. A third motion vector 513 points to the upper-left pel of the upper-right 8×8 sub-block, which is the motion vector for the upper-left 8×8 sub-block and for the right-side 8×16 sub-block relative to the (8, 0) position of the collocated MB. A fourth motion vector 515 points to the upper-left pel of the lower-right 8×8 sub-block and thus is the motion vector for the lower-right 8×8 sub-block relative to the (8, 8) position of the collocated MB. As illustrated in FIG. 5, the motion vectors 509, 511, 513 and 515 are the same since the relative motion is the same although referenced to a different origin. As described further below, the motion vector 509 for the 16×16 mode may be used for purposes of determining cost, and the reference point is derived for purposes of locating the sub-block within the reference frame 303.

Figures 6, 7:
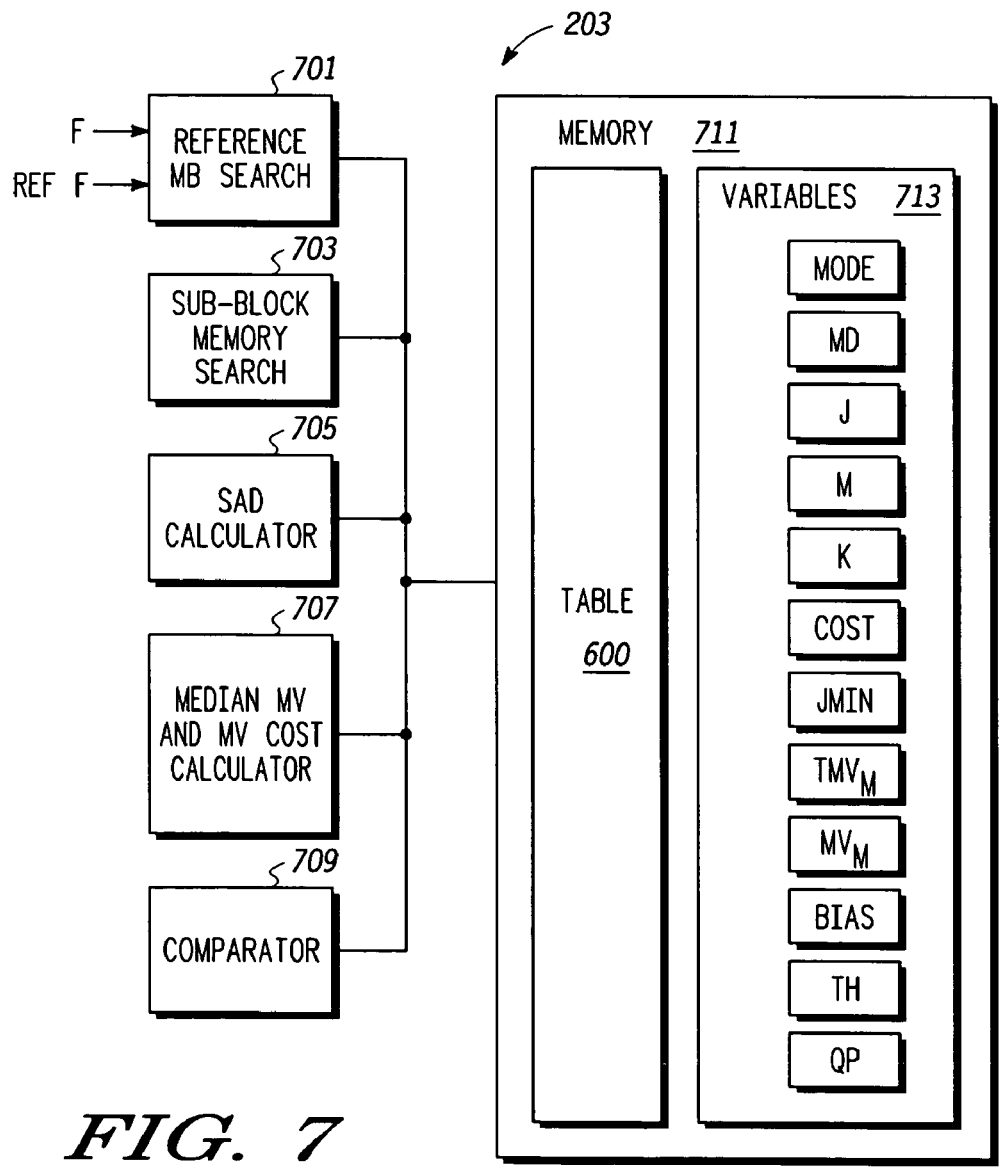
FIG. 6 is a diagram of a table for storing the motion vector and 8×8 SAD values according to an exemplary embodiment of the present invention.
FIG. 7 is a block diagram of a portion of the ME circuit of FIG. 2 for performing fast motion estimation according to an exemplary embodiment of the present invention.

Referring back to block 437 of FIG. 4, the SAD value, motion vector value and corresponding COST value is determined for each potential start MB. At next block 439, the start MB having lowest COST value is selected and its motion vector and 8×8 SAD values are stored into a table. FIG. 6 is a diagram of a table 600 for storing the motion vector and 8×8 SAD values according to an exemplary embodiment of the present invention. Each row of the table 600 stores a position value from 1 to an integer number "P" of search MBs, the corresponding 16×16 motion vector, and the corresponding four 8×8 SAD values for each search MB. The four SAD values include the upper-left (UL) SAD, the upper-right (UR) SAD, the lower-left (LL) SAD, and the lower-right (LR) SAD. The first row stores the motion vector and SAD values for the selected start MB selected at block 439, shown as MV1 and $SAD_1$, $SAD_2$, $SAD_3$ and $SAD_4$, respectively.

At next block 441, the COST value for the selected start MB is stored as a minimum cost variable value JMIN, the MODE value is stored as a mode value MD, and the corresponding MV for the selected start MB is stored as variable $MV_M$ in which the subscript "M" is the motion vector index value M initially set to one (1) at block 403. For the 16×16 motion mode, only a single MV is stored as a variable value $MV_1$. For the 16×8 and 8×16 modes, two motion variables $MV_1$ and $MV_2$ are stored and for the 8×8 mode, four motion variables $MV_1$, $MV_2$, $MV_3$ and $MV_4$ are stored. The MD value indicates the motion mode in which the lowest cost reference MB is found so far, which is the 16×16 mode by default in block 441. The JMIN, MD and $MV_M$ variable values are stored separately from the values stored in the table 600, and are used to identify the lowest cost reference MB used for encoding the current MB. The lowest cost start MB is initially identified as the lowest cost reference MB, which changes if and when a lower cost reference MB (or sub-block combination) is identified during the motion search.

At next block 443, JMIN is compared to a predetermined low cost threshold value TH. The threshold value TH is set based on video complexity and rate-distortion. At any time during the 16×16 motion mode search, if the COST of a search reference MB is sufficiently small as being equal to or less than the threshold value TH, then the fast ME search process is completed and the motion vector of the reference MB is selected for motion compensation. If JMIN is greater than TH as determined at block 443, then operation proceeds to block 445 in which it is determined whether there is another search MB according to the predetermined search pattern. If another search MB is defined according to the search pattern, operation proceeds to block 447 in which the 8×8 SADs, the 16×16 SAD, the motion vector and the COST values are determined for the next search MB. The COST is determined based on the 16×16 motion vector compared to the median MV for 16×16 mode and the 16×16 SAD in a similar manner as for each of the potential start MBs. The 16×16 motion vector and the four 8×8 SADs are stored in the next row of table 600 at next block 449. At next block 451, it is queried whether the new COST value for the next search MB is less than JMIN. If the new COST is not less than JMIN, operation returns back to block 445 to determine whether there is another search MB according to the search pattern and the current search MB is rejected. If the new COST is less than JMIN for the current search MB, then operation proceeds back to block 441 in which JMIN, MD and $MV_1$ values are updated with the COST value, MODE value and motion vector of the current search MB. In this manner, operation loops between blocks 441 and 451 and the table 600 is populated with the 16×16 motion vector and 8×8 SAD values for each search MB. As shown in table 600, the second row stores values MV2 and $SAD_5$-$SAD_8$ for the second search MB, MV3 and $SAD_9$-$SAD_{12}$ for the third search MB, and so on up to MVP and $SAD_{4P-3}$-$SAD_{4P}$ for the last of the P search MBs in the search pattern, in which the total number of 8×8 SAD values is 4P. During the loop, JMIN and $MV_1$ are updated to identify the lowest cost reference MB for the 16×16 motion mode. And if JMIN is ever less than or equal to the threshold value TH, then the loop terminates and the motion vector of the last search MB is used for motion compensation.

If the threshold value TH is not reached, then the entire table 600 is populated with the 16×16 motion vector and four 8×8 SAD values for each MB in the search pattern. When the motion search is completed as determined at block 445, operation returns back to block 403 to select the next motion mode, to reset J back to zero, and to reset the motion vector index value M back to one. The next motion mode after 16×16 is 16×8, and the cost variable J is updated with the R-D mode bias at block 405. The median MV for the upper 16×8 sub-blocks is updated at next block 407. As described further below, the lowest cost upper 16×8 sub-block is determined first followed by the lowest cost lower 16×8 sub-block and then the cost of the two 16×8 blocks are added together to determine the total cost for the 16×8 motion mode. Operation proceeds to block 411 after block 409 since the motion mode is no longer 16×16. At block 411, the SAD and motion vector from the table 600 is determined along with the COST value for the first upper 16×8 sub-block. With reference to FIG. 5, if the reference MB 503 is the start MB, then the first upper 16×8 sub-block is the upper two 8×8 blocks of the reference MB 503. Thus the upper 16×8 SAD value is determined by adding $SAD_1$ and $SAD_2$ from the table 600, or $SAD1_{16\times8}=SAD_1+SAD_2$, and the motion vector for the first upper 16×8 sub-block is MV1 from table 600. The COST for the first upper 16×8 sub-block is the $SAD1_{16\times8}$ value combined with the encoding cost of MV1, which is determined based on the 16×8 median MV as determined at block 407.

At next block 413, a cost variable K is set equal to the COST value of the first upper 16×8 block, and a temporary motion vector variable $TMV_M$, which is $TMV_1$ in the first iteration, is updated with the MV value from table 600, which is MV1 in the first iteration. At next block 415, the SAD and motion vector from the table 600 is determined for the next upper 16×8 sub-block. In the first iteration, the SAD value for the next upper 16×8 sub-block is $SAD2_{16\times8}=SAD_5+SAD_6$, and the motion vector is MV2. The COST is determined is determined in the same manner as previously described. At next block 417, the new COST value is compared with K to determine if the second upper 16×8 block has a lower encoding cost relative to the first. If not, operation proceeds to next block 419 in which it is queried whether there is another upper 16×8 search block in table 600. If so, operation proceeds back to block 415 in which the SAD and motion vector values are determined for the next upper 16×8 sub-block in the same manner as previously described. If the new COST value is less than K as determined at block 417, then operation returns instead back to block 413 in which the K and $TMV_M$ ($TMV_M$=$TMV_1$ in first iteration) values are updated with the new cost and MV values of the current upper 16×8 sub-block. In this manner, operation loops between blocks 413 and 419 while the first four columns of table 600 to determine the lowest cost for the upper 16×8 sub-block. The loop ends once all sub-blocks in terms of motion vectors in the table 600 are visited.

After the cost of the last upper 16×8 sub-block is determined, operation proceeds to next block 421 in which the J value is increased by the cost variable K. At this point, K is the cost of the lowest cost upper 16×8 sub-block found in table 600. At next block 423, it is determined if the 16×8 motion mode is completed. Since only the lowest cost upper 16×8 sub-block has been determined, the 16×8 motion mode is not complete and operation proceeds to block 425 in which the motion vector index value M is incremented or otherwise increased by one (1) (so that M=2 in the second iteration). Operation then returns to block 407 in which the median MV for the lower 16×8 sub-block is determined. Operation then proceeds to block 411 in which the SAD and motion vector from the table 600 is determined along with the COST value for the first lower 16×8 sub-block. The first lower 16×8 SAD value is determined by adding $SAD_3$ and $SAD_4$ from the table 600, and the motion vector for the first lower 16×8 sub-block is MV1 from table 600. It is noted that MV1 may be used directly since it is a relative value and since the reference point is to the lower 16×8 sub-block. The COST for the first lower 16×8 sub-block is the combined $SAD_3+SAD_4$ values along with the cost of the corresponding motion vector, which is determined based on the lower 16×8 median MV found at block 407.

Operation then proceeds to loop between blocks 413-419 for the lower 16×8 sub-blocks. The K value is updated with the cost of the lowest cost lower 16×8 sub-block and the corresponding temporary motion vector is stored as $TMV_2$ at block 413. Operation is substantially identical as previously described, except that the SAD information is calculated using the right-most two columns of table 600 and the motion vector information is derived from the 16×16 motion vectors in the second column of table 600 as previously described. After the lowest cost lower 16×8 sub-block is found, operation proceeds to block 421 in which the cost variable J is increased by K. In this case, J has already been updated with the R-D mode bias for 16×8 mode (at block 405) and the cost of the upper 16×8 sub-block as previously described. Thus, after block 421 in the second iteration for the 16×8 motion mode, the J value reflects the total cost for the combined upper and lower 16×8 sub-blocks for the 16×8 motion mode. Operation then proceeds to block 427 since the 16×8 motion mode is complete, and it is queried at block 427 whether J is less than JMIN. Recall that at this point, JMIN is the cost of the lowest cost 16×16 reference MB for the 16×16 motion mode. If the total cost of the two lowest cost 16×8 sub-blocks is less than the cost of the single 16×16 reference MB, then operation proceeds to block 429 in which JMIN is updated with the J value, MD is updated with the MODE value, and each of the $MV_M$ values is updated with the corresponding $TMV_M$ value. The 16×8 motion mode includes two motion vectors $MV_1$ and $MV_2$ which point to or otherwise identify the lowest cost upper and lower 16×8 sub-blocks. After JMIN, MD and the $MV_M$ values are updated at block 429, operation proceeds to block 431 to compare the updated JMIN value with the threshold value TH. If JMIN is less than or equal to TH, then the search is completed. If J is not less than JMIN as determined at block 427 or if JMIN is not less than or equal to TH as determined at block 431, operation proceeds to block 433 in which it is queried whether there are any more motion modes to consider.

After the 16×16 and 16×8 motion modes have completed, operation returns back to block 403 to select the next motion mode, which is 8×16. Again, J is reset to zero and M is set equal to 1. At next block 405, J is increased by the R-D mode bias for the 8×16 mode. The blocks 407-425 are executed in substantially identical manner for the 8×16 mode as for the 16×8 mode described above. The main difference is that rather than searching for the lowest cost upper and lower 16×8 sub-blocks, the loop is again executed twice to search for the lowest cost left-hand and right-hand 8×16 sub-blocks. With reference to the reference MB 503, the SAD value for the first left-hand 8×16 sub-block is determined by adding $SAD_1$ and $SAD_3$ and the SAD value for the first right-hand sub-block is determined by adding $SAD_2$ and $SAD_4$. Thus, in the first iteration of the loop for the 8×16 mode, the UL SAD is added to the LL SAD for each left-hand SAD value and in the second iteration of the loop for the 8×16 mode, the UR SAD is added to the LR SAD for each right-hand SAD value. Each motion vector is derived from the corresponding one of the 16×16 motion vectors MV1-MVP as previously described. After the lowest cost left-hand and right-hand 8×16 sub-blocks are identified and J is set to the total cost of the 8×16 motion mode at block 421, J is again compared with JMIN at block 427. If J is less than JMIN as determined at block 427, then the total cost of the 8×16 motion mode is less than the cost of either the 16×16 or 16×8 modes and the JMIN, MD and $MV_M$ values are updated at block 429 as previously described. The new JMIN is compared with TH at block 431 to determine whether the threshold has been reached. If J is not less than JMIN or if JMIN is greater than TH, operation proceeds to block 433 in which it is queried whether there are any more motion modes to consider.

After the 16×16, 16×8 and 8×16 motion modes have completed, operation returns back to block 403 to select the next motion mode, which is 8×8. Again, J is reset to zero and M is set equal to 1. At next block 405, J is increased by the R-D mode bias for the 8×8 mode. The blocks 407-425 are executed in substantially similar manner for the 8×8 mode as for the 16×8 and 8×16 modes described above. The main difference is that rather than searching for two sub-blocks in two executions of the loop, the loop is executed four times to search for the lowest cost UL, UR, LL and LR 8×8 sub-blocks. With reference to the reference MB 503, the SAD value for the UL 8×8 sub-block is $SAD_1$, the SAD value for the UR 8×8 sub-block is $SAD_2$, the SAD value for the LL 8×8 sub-block is $SAD_3$, and the SAD value for the LR sub-block is $SAD_4$. Thus, in the first iteration of the loop for the 8×8 mode, the cost of the UL 8×8 sub-blocks are compared, in the second iteration the cost of the UR 8×8 sub-blocks are compared, in the third iteration the cost of the UL 8×8 sub-blocks are compared, and in the fourth iteration the cost of the LR 8×8 sub-blocks are compared. The motion vectors are derived from the 16×16 motion vectors as previously described. After the four lowest cost 8×8 sub-blocks are identified and J is set to the total cost of the 8×8 motion mode at block 421, J is again compared with JMIN at block 427. If J is less than JMIN, then the total cost of the 8×8 motion mode is less than the cost of any of the 16×16, 16×8 and 8×16 modes and the JMIN, MD and $MV_M$ values are updated at block 429. Note that in this case there are four $MV_M$ values $MV_1$-$MV_4$ that are used to identify the lowest cost 8×8 sub-blocks. The new JMIN is again compared with TH at block 431 to determine whether the threshold has been reached. If J is not less than JMIN or if JMIN is greater than TH, operation proceeds to block 433 in which it is queried whether there are any more motion modes to consider.

After the 8×8 motion mode is completed or if the threshold value TH was reached during any of the searches, operation is completed and the reference MB identified by the $MV_M$ and MD values is used as the reference MB for motion compensation. The reference MB is either a single 16×16 MB from the 16×16 motion mode or a sub-block combination for the other modes. The sub-block combinations include a pair of 16×8 or 8×16 sub-blocks from the 16×8 or 8×16 modes, respectively, or four different 8×8 sub-blocks from the 8×8 mode. The $MV_M$ values and the stored MD value are sufficient to identify a single reference MB or sub-block combination to be used as the reference MB for interframe encoding.

FIG. 7 is a block diagram of a portion of the ME circuit 203 for performing fast motion estimation according to an exemplary embodiment of the present invention. A reference MB search circuit 701 receives the current frame F and reference frame REF F along with other information identifying the current MB to be encoded. The reference MB search circuit 701 is coupled to a sub-block memory search circuit 703, a SAD calculator circuit 705, a median MV and MV cost calculator circuit 707, a comparator circuit 709, and a memory 711. The memory 711 is implemented as any combination of read-only memory (ROM) or random access memory (RAM) devices or registers and the like and stores the table 600 and variables 713 used during the process of fast motion search according to an embodiment of the present invention. The variables 713 include, for example, the MODE, MD, J, M, K, COST, JMIN, TMVM, MVM, BIAS, TH and QP values described above with reference to FIG. 4.

The reference MB search circuit 701 generally controls performance of the functions of blocks 437 and 447 for calculating the 8×8 SADs, the 16×16 SAD, the motion vectors and corresponding costs for each potential start MB and for each 16×16 MB along the selected search path within the selected search area 305 of the reference frame 303. The reference MB search circuit 701 also performs the functions of blocks 439 and 449 for storing the motion vector and 8×8 SAD values into the table 600. The SAD values are determined by the SAD calculator circuit 705. In one embodiment, for example, the reference MB search circuit 701 passes the motion vector of the search MB and the SAD calculator circuit 705 calculates the corresponding 16×16 SAD and 8×8 SAD values. The median MV and MV cost calculator circuit 707 determines the median MV, motion vector and motion vector encoding cost for each MB and sub-block. The reference MB search circuit 701 uses the SAD and MV cost information for determining the cost of encoding the current MB.

The sub-block memory search circuit 703 searches the motion vector and SAD information in the table 600 for determining the lowest cost sub-block combination for each motion mode as described in certain of the blocks 411-433 (e.g., block 411, 415). The sub-block memory search circuit 703 employs the median MV and MV cost calculator 707 for determining the motion vector cost and adds the appropriate 8×8 SAD values from the table 600 to determine the corresponding cost of each sub-block, and then adds the lowest cost sub-blocks together. The sub-block memory search circuit 703 further adds the appropriate mode bias for according to the appropriate motion mode as described at block 405.

The comparator circuit 709 generally ensures that the JMIN, MD and $MV_M$ values are updated with the lowest cost reference MB or sub-block combination. In particular, after the reference MB search circuit 701 determines the cost of each start MB, the comparator circuit 709 initializes or otherwise updates the JMIN, MD and $MV_M$ values as described at block 441. The comparator circuit 709 also compares JMIN with each new COST value as described at block 451 for each next MB in the search pattern and updates the JMIN, MD and $MV_M$ values accordingly at block 441 if the new cost is less than JMIN. The comparator circuit 709 further compares JMIN with the threshold values as described at block 443 and if the threshold is achieved at any time, the current MB is selected as the reference MB for interframe encoding. After the table 600 is completed and if the threshold is not achieved, the comparator circuit 709 performs blocks 427, 429 and 431 to compare the cost of each new sub-block combination determined by the sub-block memory search circuit 703 with the currently stored JMIN value and the threshold value. Again, the JMIN, MD and $MV_M$ values are updated accordingly whenever the new COST value is less than the current JMIN value, and the new sub-block combination is selected as the reference MB for encoding if the threshold is achieved.

A method of fast motion estimation to determine a reference macroblock within a reference frame for a current macroblock in a current frame according to an embodiment of the present invention includes determining a motion vector, a difference value, and a cost value for each of multiple macroblocks within the reference frame according to a fast motion estimation search pattern, comparing cost values and selecting motion vector data, a motion mode and a cost value of a current lowest cost macroblock for each macroblock, determining and storing a difference value for each of multiple sub-blocks and at least one corresponding motion vector as stored information for each macroblock, searching the stored information and determining a lowest cost sub-block combination, comparing a cost value of the lowest cost sub-block combination with the cost value of the current lowest cost macroblock, selecting between the lowest cost sub-block combination and the current lowest cost macroblock as the reference macroblock.

The method may include comparing relative cost of multiple potential start macroblocks, selecting a lowest cost start macroblock as a first of the macroblocks within the reference frame, and determining the fast motion estimation search pattern relative to the selected start macroblock. The method may include determining a sum of absolute difference (SAD) of picture elements between the current macroblock and a macroblock within the reference frame. The method may include determining a cost of encoding a motion vector of a macroblock relative to a motion vector prediction and adding the cost of encoding the motion vector to the difference value.

The method may further include combining a sub-block motion mode bias for each sub-block motion mode. The method may further include comparing a cost of the current lowest cost macroblock with a predetermined threshold after the selecting motion vector data, a motion mode and a cost value that identifies a current lowest cost macroblock, comparing a cost of the current lowest cost macroblock with the predetermined threshold after the selecting between the lowest cost sub-block combination and the current lowest cost macroblock to update the current lowest cost macroblock, and selecting the current lowest cost macroblock as the reference macroblock whenever the cost of the current lowest cost macroblock is less than or equal to the predetermined threshold.

In a more specific embodiment, the method includes storing a motion vector locating a macroblock within the reference frame, and determining and storing four 8×8 SAD values for the located macroblock. In this embodiment, the method may further include determining a cost of encoding a motion vector for an upper 16×8 sub-block relative to a first median MV and adding an upper pair of 8×8 SAD values for each macroblock, determining a lowest cost upper 16×8 sub-block, determining a cost of encoding a motion vector for a lower 16×8 sub-block relative to a second median MV and adding a lower pair of 8×8 SAD values for each macroblock, determining a lowest cost lower 16×8 sub-block, and combining a cost of the upper lowest cost 16×8 sub-block with a cost of the lower lowest cost 16×8 sub-block. The method may also include determining a cost of encoding a motion vector for a left-hand 8×16 sub-block relative to a first median MV and adding a left-hand pair of 8×8 SAD values for each macroblock, determining a lowest cost left-hand 8×16 sub-block, determining a cost of encoding a motion vector for a right-hand 8×16 sub-block relative to a second median MV and adding a right-hand pair of 8×8 SAD values for each macroblock, determining a lowest cost right-hand 8×16 sub-block, and combining a cost of the left-hand lowest cost 8×16 sub-block with a cost of the right-hand lowest cost 8×16 sub-block. The method may further include determining a cost of encoding a motion vector for an upper-left 8×8 sub-block relative to a first median MV for each macroblock, determining a lowest cost upper-left 8×8 sub-block, determining a cost of encoding a motion vector for an upper-right 8×8 sub-block relative to a second median MV for each macroblock, determining a lowest cost upper-right 8×8 sub-block, determining a cost of encoding a motion vector for a lower-left 8×8 sub-block relative to a third median MV for each macroblock, determining a lowest cost lower-left 8×8 sub-block, determining a cost of encoding a motion vector for a lower-right 8×8 sub-block relative to a fourth median MV for each macroblock, determining a lowest cost lower-right 8×8 sub-block, and combining costs of the upper-left, upper-right, lower-left and lower-right 8×8 sub-blocks.

A fast motion estimation system that determines a reference macroblock within a reference frame for a current macroblock in a current frame according to an embodiment of the present invention includes a memory, a reference macroblock search circuit, a sub-block combination search circuit, and a comparator circuit. The reference macroblock search circuit determines a motion vector, multiple difference values, and a cost value for each macroblock within the reference frame according to a fast motion estimation search pattern, and stores the motion vector and the difference values in the memory. The sub-block combination search circuit searches the motion vector and the difference values in the memory for determining a corresponding one of multiple lowest cost sub-block combinations for each of multiple sub-block motion modes. The comparator circuit determines a lowest cost macroblock and selects from among the lowest cost macroblock and the lowest cost sub-block combinations to determine the reference macroblock.

The comparator circuit may compare relative cost of multiple potential start macroblocks, select a lowest cost start macroblock as a first of the macroblocks within the reference frame. In this case the reference macroblock search circuit initiates the fast motion estimation search pattern beginning with the lowest cost start macroblock. The reference macroblock search circuit may include a SAD calculation circuit. The reference macroblock search circuit may include a motion vector prediction and calculation circuit. The reference macroblock search circuit may be implemented to determine and store in the memory four 8×8 SAD values for each of the macroblocks within the reference frame.

The sub-block combination search circuit may be implemented to determine a lowest cost upper 16×8 sub-block and a lowest cost lower 16×8 sub-block to determine a lowest cost sub-block combination for a 16×8 motion mode, to determine a lowest cost left-hand 8×16 sub-block and a lowest cost right-hand 8×16 sub-block to determine a lowest cost sub-block combination for an 8×16 motion mode, and to determine a lowest cost upper-left 8×8 sub-block, a lowest cost upper-right 8×8 sub-block, a lowest cost lower-left 8×8 sub-block, and a lowest cost lower-right 8×8 sub-block to determine a lowest cost sub-block combination for an 8×8 motion mode.

The sub-block combination search circuit may be implemented to combine a corresponding sub-block motion mode bias for each of the sub-block motion modes. The comparator circuit may be implemented to compare a cost value of each macroblock and each of the lowest cost sub-block combinations with the predetermined threshold and to select a macroblock or sub-block combination as the reference macroblock if a corresponding cost value achieves the predetermined threshold.

A video encoder according to an embodiment of the present invention includes first and second memories, a subtract circuit, a transform and quantization circuit, an inverse transform and inverse quantization circuit, a motion compensation circuit, a deblock filter and a motion estimation circuit. The first memory stores a current frame and the second memory stores a reference frame. The subtract circuit has a negative input receiving interframe prediction information, a positive input receiving current frame information, and an output providing residual information. The transform and quantization circuit has an input coupled to the output of the subtract circuit and an output providing quantized transform coefficients. The inverse transform and inverse quantization circuit has an input coupled to the output of the transform and quantization circuit and an output providing reconstructed residual information. The adder has a first input receiving the interframe prediction information, a second input coupled to the output of the inverse transform and inverse quantization circuit, and an output providing reconstructed frame information. The deblock filter has an input coupled to the output of the adder and an output providing filtered reconstructed frame information for storage in the second memory. The motion compensation circuit has an input receiving at least one reference motion vector of a reference macroblock within the reference frame, and an output providing the interframe prediction information. The motion estimation circuit has a first input receiving the current frame, a second input receiving the reference frame and an output providing least one reference motion vector for the reference block.

The motion estimation circuit of the video encoder includes a third memory, a reference macroblock search circuit, a sub-block combination search circuit, and a comparator circuit. The reference macroblock search circuit determines a motion vector, multiple difference values, and a cost value for each of multiple macroblocks within the reference frame according to a fast motion estimation search pattern, and stores the motion vector and the difference values in the third memory. The sub-block combination search circuit searches the third memory to find a lowest cost sub-block combination for each of multiple sub-block motion modes. The comparator circuit determines a lowest cost macroblock and selects from among the lowest cost macroblock and the lowest cost sub-block combinations to determine at least one reference motion vector of the reference macroblock.

In one embodiment, the reference macroblock search circuit stores a 16×16 motion vector and four 8×8 SAD values in the third memory for each macroblock within the reference frame according to the fast motion estimation search pattern, and the sub-block combination search circuit scans the third memory to find a lowest cost sub-block combination for a 16×8 motion mode, a lowest cost sub-block combination for an 8×16 motion mode, and a lowest cost sub-block combination for an 8×8 motion mode.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of encoding video information using fast motion estimation to determine a reference macroblock within a reference frame for a current macroblock in a current frame, comprising:

determining a motion vector, a difference value, and a cost value for each of a plurality of macroblocks within the reference frame according to a fast motion estimation search pattern;

for each of the plurality of macroblocks, comparing cost values and selecting motion vector data, a motion mode and a cost value of a current lowest cost macroblock;

for each of the plurality of macroblocks, determining and storing a difference value for each of a plurality of sub-blocks and at least one corresponding motion vector as stored information;

for each of a plurality of sub-block motion modes, searching the stored information and determining a lowest cost sub-block combination, comparing a cost value of the lowest cost sub-block combination with the cost value of the current lowest cost macroblock;

selecting between the lowest cost sub-block combination and the current lowest cost macroblock as the reference macroblock; and encoding video information using the selected reference macroblock.

2. The method of claim 1, further comprising:

comparing relative cost of a plurality of potential start macroblocks;

selecting a lowest cost start macroblock as a first of the plurality of macroblocks within the reference frame; and determining the fast motion estimation search pattern relative to the selected start macroblock.

3. The method of claim 1, wherein said determining a difference value for each of a plurality of macroblocks comprises determining a sum of absolute difference (SAD) of picture elements between the current macroblock and a macroblock within the reference frame.

4. The method of claim 1, wherein said determining a cost value for each of a plurality of macroblocks comprises determining a cost of encoding a motion vector of a macroblock relative to a motion vector prediction and adding the cost of encoding the motion vector to the difference value.

5. The method of claim 1, wherein said storing a difference value for each of a plurality of sub-blocks and at least one corresponding motion vector as stored information comprises:
  storing a motion vector locating a macroblock within the reference frame; and
  determining and storing four 8×8 sum of absolute difference (SAD) values for the located macroblock.

6. The method of claim 5, wherein said searching the stored information and determining a lowest cost sub-block combination for each of a plurality of sub-block motion modes comprises:
  for each of the plurality of macroblocks, determining a cost of encoding a motion vector for an upper 16×8 sub-block relative to a first median MV and adding an upper pair of 8×8 SAD values;
  determining a lowest cost upper 16×8 sub-block;
  for each of the plurality of macroblocks, determining a cost of encoding a motion vector for a lower 16×8 sub-block relative to a second median MV and adding a lower pair of 8×8 SAD values;
  determining a lowest cost lower 16×8 sub-block; and
  combining a cost of the upper lowest cost 16×8 sub-block with a cost of the lower lowest cost 16×8 sub-block.

7. The method of claim 5, wherein said searching the stored information and determining a lowest cost sub-block combination for each of a plurality of sub-block motion modes comprises:
  for each of the plurality of macroblocks, determining a cost of encoding a motion vector for a left-hand 8×16 sub-block relative to a first median MV and adding a left-hand pair of 8×8 SAD values;
  determining a lowest cost left-hand 8×16 sub-block;
  for each of the plurality of macroblocks, determining a cost of encoding a motion vector for a right-hand 8×16 sub-block relative to a second median MV and adding a right-hand pair of 8×8 SAD values;
  determining a lowest cost right-hand 8×16 sub-block; and
  combining a cost of the left-hand lowest cost 8×16 sub-block with a cost of the right-hand lowest cost 8×16 sub-block.

8. The method of claim 5, wherein said searching the stored information and determining a lowest cost sub-block combination for each of a plurality of sub-block motion modes comprises:
  for each of the plurality of macroblocks, determining a cost of encoding a motion vector for an upper-left 8×8 sub-block relative to a first median MV;
  determining a lowest cost upper-left 8×8 sub-block;
  for each of the plurality of macroblocks, determining a cost of encoding a motion vector for an upper-right 8×8 sub-block relative to a second median MV;
  determining a lowest cost upper-right 8×8 sub-block;
  for each of the plurality of macroblocks, determining a cost of encoding a motion vector for a lower-left 8×8 sub-block relative to a third median MV;
  determining a lowest cost lower-left 8×8 sub-block;
  for each of the plurality of macroblocks, determining a cost of encoding a motion vector for a lower-right 8×8 sub-block relative to a fourth median MV;
  determining a lowest cost lower-right 8×8 sub-block; and
  combining costs of the upper-left, upper-right, lower-left and lower-right 8×8 sub-blocks.

9. The method of claim 1, further comprising combining a sub-block motion mode bias for each of the plurality of sub-block motion modes.

10. The method of claim 1, further comprising:
  comparing a cost of the current lowest cost macroblock with a predetermined threshold after said selecting motion vector data, a motion mode and a cost value that identifies a current lowest cost macroblock;
  comparing a cost of the current lowest cost macroblock with the predetermined threshold after said selecting between the lowest cost sub-block combination and the current lowest cost macroblock to update the current lowest cost macroblock; and
  selecting the current lowest cost macroblock as the reference macroblock whenever the cost of the current lowest cost macroblock is less than or equal to the predetermined threshold.

11. A fast motion estimation system that determines a reference macroblock within a reference frame for a current macroblock in a current frame, comprising:
  a memory;
  a reference macroblock search circuit which determines a motion vector, a plurality of difference values, and a cost value for each of a plurality of macroblocks within the reference frame according to a fast motion estimation search pattern, and which stores said motion vector and said plurality of difference values in said memory;
  a sub-block combination search circuit which searches said motion vector and said plurality of difference values in said memory for determining a corresponding one of a plurality of lowest cost sub-block combinations for each of a plurality of sub-block motion modes; and
  a comparator circuit which determines a lowest cost macroblock and which selects from among said lowest cost macroblock and said plurality of lowest cost sub-block combinations to determine the reference macroblock.

12. The fast motion estimation system of claim 11, wherein said comparator circuit compares relative cost of a plurality of potential start macroblocks, selects a lowest cost start macroblock as a first of said plurality of macroblocks within the reference frame, and wherein said reference macroblock search circuit initiates said fast motion estimation search pattern beginning with said lowest cost start macroblock.

13. The fast motion estimation system of claim 11, wherein said reference macroblock search circuit comprises a sum of absolute difference (SAD) calculation circuit.

14. The fast motion estimation system of claim 11, wherein said reference macroblock search circuit comprises a motion vector prediction and calculation circuit.

15. The fast motion estimation system of claim 11, wherein said reference macroblock search circuit determines and stores in said memory four 8×8 sum of absolute difference (SAD) values for each of said plurality of macroblocks within the reference frame.

16. The fast motion estimation system of claim 15, wherein said sub-block combination search circuit determines a lowest cost upper 16×8 sub-block and a lowest cost lower 16×8 sub-block to determine a lowest cost sub-block combination for a 16×8 motion mode, determines a lowest cost left-hand 8×16 sub-block and a lowest cost right-hand 8×16 sub-block to determine a lowest cost sub-block combination for an 8×16 motion mode, and determines a lowest cost upper-left 8×8 sub-block, a lowest cost upper-right 8×8 sub-block, a lowest cost lower-left 8×8 sub-block, and a lowest cost lower-right 8×8 sub-block to determine a lowest cost sub-block combination for an 8×8 motion mode.

17. The fast motion estimation system of claim of claim 11, wherein said sub-block combination search circuit combines a corresponding one of a plurality of sub-block motion mode biases for each of said plurality of sub-block motion modes.

18. The fast motion estimation system of claim 11, wherein said comparator circuit compares a cost value of each of said plurality of macroblocks and each of said plurality of lowest cost sub-block combinations with said predetermined threshold and selects a macroblock or sub-block combination as the reference macroblock if a corresponding cost value achieves said predetermined threshold.

19. A video encoder, comprising:
a first memory storing a current frame;
a second memory storing a reference frame;
a subtract circuit having a negative input receiving interframe prediction information, a positive input receiving current frame information, and an output providing residual information;
a transform and quantization circuit having an input coupled to said output of said subtract circuit and an output providing quantized transform coefficients;
an inverse transform and inverse quantization circuit having an input coupled to said output of said transform and quantization circuit and having an output providing reconstructed residual information;
an adder having a first input receiving said interframe prediction information, a second input coupled to said output of said inverse transform and inverse quantization circuit, and an output providing reconstructed frame information;
a deblock filter having an input coupled to said output of said adder and an output providing filtered reconstructed frame information for storage in said second memory;
a motion compensation circuit having an input receiving at least one reference motion vector of a reference macroblock within said reference frame and an output providing said interframe prediction information; and
a motion estimation circuit having a first input receiving said current frame, a second input receiving said reference frame and an output providing said at least one reference motion vector for said reference block, said motion estimation circuit comprising:
a third memory;
a reference macroblock search circuit which determines a motion vector, a plurality of difference values, and a cost value for each of a plurality of macroblocks within said reference frame according to a fast motion estimation search pattern, and which stores said motion vector and said plurality of difference values in said third memory;
a sub-block combination search circuit which searches said third memory to find a lowest cost sub-block combination for each of a plurality of sub-block motion modes; and
a comparator circuit which determines a lowest cost macroblock and which selects from among said lowest cost macroblock and said plurality of lowest cost sub-block combinations to determine said at least one reference motion vector of said reference macroblock.

20. The video encoder of claim 19, wherein:
said reference macroblock search circuit stores a 16×16 motion vector and four 8×8 sum of absolute difference (SAD) values in said third memory for each of said plurality of macroblocks within said reference frame according to said fast motion estimation search pattern; and
wherein said sub-block combination search circuit scans said third memory to find a lowest cost sub-block combination for a 16×8 motion mode, a lowest cost sub-block combination for an 8×16 motion mode, and a lowest cost sub-block combination for an 8×8 motion mode.

* * * * *